US005693241A

United States Patent [19]

Banks et al.

[11] Patent Number: 5,693,241

[45] Date of Patent: Dec. 2, 1997

[54] ATMOSPHERIC PRESSURE METHOD AND APPARATUS FOR REMOVAL OF ORGANIC MATTER WITH ATOMIC AND IONIC OXYGEN

[75] Inventors: Bruce A. Banks, Olmsted Township; Sharon K. Rutledge, Bedford, both of Ohio

[73] Assignee: The United States of America as represented by the Administrator of the National Aeronautics and Space Administration, Washington, D.C.

[21] Appl. No.: 687,116

[22] Filed: Jun. 18, 1996

[51] Int. Cl.[6] .................... B23K 15/00

[52] U.S. Cl. .................... 219/121.11; 219/121.19; 216/66; 216/67; 315/111.81

[58] Field of Search .................... 315/111.81, 111.61, 315/111.21; 216/66, 67; 219/121.11, 121.12, 121.34, 121.19, 121.43; 156/643.1, 668; 204/192.34

[56] References Cited

U.S. PATENT DOCUMENTS

| | | | |
|---|---|---|---|
| 4,548,033 | 10/1985 | Cann | 315/111.61 X |
| 4,609,445 | 9/1986 | Collins | 204/165 |
| 4,995,805 | 2/1991 | Hilliard | 315/111.71 X |
| 5,009,743 | 4/1991 | Swann | 156/643 |
| 5,147,465 | 9/1992 | Maruyama et al. | 134/1 |
| 5,194,118 | 3/1993 | Shinohara | 156/643 |
| 5,344,526 | 9/1994 | Nishibayashi et al. | 156/643 |
| 5,369,336 | 11/1994 | Koinuma et al. | 315/111.21 |
| 5,391,855 | 2/1995 | Tanisaki | 219/121.43 |
| 5,417,798 | 5/1995 | Nishibayashi et al. | 216/67 |
| 5,518,595 | 5/1996 | Yamakage | 216/66 X |
| 5,554,257 | 9/1996 | Yokogawa et al. | 216/66 X |
| 5,597,495 | 1/1997 | Keil et al. | 216/66 |

*Primary Examiner*—Robert Pascal
*Assistant Examiner*—Haissa Philogene
*Attorney, Agent, or Firm*—Kent N. Stone

[57] ABSTRACT

A gas stream containing ionic and atomic oxygen in inert gas is used to remove organic matter from a substrate. The gas stream is formed by flowing a mixture of gaseous oxygen in an inert gas such as helium at atmospheric pressure past a high voltage, current limited, direct current arc which contacts the gas mixture and forms the ionic and atomic oxygen. The arc is curved at the cathode end and the ionic oxygen formed by the arc nearer to the anode end of the arc is accelerated in a direction towards the cathode by virtue of its charge. The relatively high mass to charge ratio of the ionic oxygen enables at least some of it to escape the arc before contacting the cathode and it is directed onto the substrate. This is useful for cleaning delicate substrates such as fine and historically important paintings and delicate equipment and the like.

16 Claims, 2 Drawing Sheets

ATMOSPHERIC PRESSURE METHOD AND APPARATUS FOR REMOVAL OF ORGANIC MATTER WITH ATOMIC AND IONIC OXYGEN

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

1. Field of the Invention

The invention relates to a method and apparatus for generating an atomic and ionic oxygen stream useful for cleaning and etching substrates. More particularly, the invention relates to a method for removing surface organic matter from delicate substrates with a gaseous stream of atomic and ionic oxygen and to an apparatus for generating the stream.

2. Background of the Disclosure

Removal of organic contaminants from sensitive surfaces of delicate instrumentation, optics and other hardware is often a very time consuming and extremely delicate and demanding process which permits few errors. Typical contaminants include organic adhesives, lubricants, paint and varnish, other organic contaminants and air borne organic debris. The removal or cleaning process is often accomplished using swabs containing rapidly evaporating and environmentally unfriendly solvents which can be toxic and of themselves adversely effect the surface which is being cleaned and flow and migrate into equipment being cleaned, thereby contaminating the equipment or destroying needed internal lubrication. The removal of darkened and degraded varnish from fine and historically important paintings and the like is also accomplished using solvent soaked swabs and patches which sometimes removes some of the underlying painting. This technique is particularly difficult to carry out without damage to the painting surface when the surface is rough. Further, solvent-swab removal of soot and fire damaged organic contaminants cannot easily remove all carbonaceous deposits. Thus, it is difficult to fully restore a smoke or soot contaminated painting to its original form and appearance without risking damage to the pigment. In some cases, such as polyurethane varnishes, no solvents are available which can be used to remove the varnish without damaging the painted surface. The removal of aged or degraded varnishes by mechanical techniques such as sharp and delicate instruments which cut away the varnish is an extremely labor intensive and tedious task requiring very accurate manipulation of the cutting instrument to prevent damage to the underlying painted surface. It is very difficult to use such instruments to uniformly remove the degraded varnish layer. Non-contact removal methods which involve laser ablation, vaporize the thickness of the varnish and/or painting surface depending on the light absorption characteristics of the incident radiation. Thus, painting pigment and spatial varnish variation may cause the radiation to remove varnish in some areas yet remove both varnish and pigment in areas where the varnish is thinner or the pigment is of such a color that the radiation absorption is higher.

Subatmospheric pressure and atmospheric pressure plasma beams and generating devices have long been used for ion beam milling, dry etching and cleaning of metallic and similar surfaces, and for very precise and minute ionic milling of articles and the like. Very often the plasma is generated by means of microwaves and the plasma beam assisted to its target by a magnetic field. Typically this is done under sealed conditions at subatmospheric pressure and the target often becomes very hot and must be cooled during the process. Atmospheric plasma treatment for activating the surface of plastic has been used in which plastic sheeting or ribbon rapidly travels over a plasma device in which the plasma is generated by an alternating current electric field between the two electrodes, as disclosed in U.S. Pat. No. 5,391,855. The plasma is diffuse or isotropic and cannot be aimed. U.S. Pat. No. 5,369,336 discloses an apparatus for generating a plasma at atmospheric pressure from a mixture of helium and a fluorinated etching gas for etching the surface of a silicon wafer. The plasma is generated by a high frequency alternating current applied across a pair of concentric electrodes separated by means of a cylindrical dielectric body between the electrodes. The central electrode is illustrated and described as being in the shape of a flat ended cylindrical rod. Plasma generated under atmospheric pressure has a much higher probability of ionic and atomic particle collision than does a plasma generated under subatmospheric pressure or vacuum. Thus, the mean free path of the ionized material is short due to the higher probability of the plasma generated ionic particles recombining within a given distance.

It would be an advancement to the art if a non-contact removal method, such as a plasma, atomic or ionic beam, could be developed and used to remove organic contaminants from delicate surfaces without damaging the underlying surface.

SUMMARY OF THE INVENTION

The invention relates to a method and an apparatus for generating a gaseous stream containing ionic and atomic oxygen and to its use in a non-contact method for removing organic matter from a substrate. The method of the invention provides a stream or beam of ionic and atomic oxygen in an inert gas at atmospheric pressure which is able to be directed at a surface and guided to wherever it is desired to remove organic contaminants or to etch the surface. The apparatus for generating the beam can be configured so as to be small enough to be held in one's hand and used as an ionic wand or brush, which is ideal for removing organic matter from delicate surfaces such as those described above. In the practice of the invention, a flowing gaseous stream of oxygen in a carrier gas contacts a weak plasma or arc, often referred to by those skilled in the art as a glow discharge, generated by a high voltage direct current (D.C.) applied across a pair of electrodes. During the contacting the arc produces the ionic and atomic oxygen. The arc itself is curved proximate the cathode. The gaseous stream is directed away from the anode and past the arc and the cathode in the direction desired. The ionic oxygen is accelerated in the desired direction and, due to its high mass to charge ratio (compared to an electron), is unable to make the turn back to the cathode with the plasma and thereby escapes the arc and is propelled and swept to the target as part of the gaseous stream containing the atomic oxygen, carrier gas and oxygen which has not been converted from its molecular state to the more active ionic and atomic state. The end of the anode is needle-shaped and is upstream of the cathode which possesses a hole or orifice extending therethrough for the activated gaseous stream containing the ionic and atomic oxygen (hereinafter referred to as "ionic stream" for the sake of convenience) to flow through the orifice and to the target. In a preferred embodiment the cathode is shaped like an annulus or washer having a centrally located circular orifice. The end of the anode is positioned upstream and spaced apart from the annular cathode with its tip positioned approximately coincident with the axis of the orifice. In contrast to the prior art methods which use an alternating current to generate a plasma, the use of a direct current is an essential feature of the invention which, when combined with the curved arc structure, accelerates the ionic oxygen generated by the arc to enable at least a portion of it to escape the arc and be directed to the substrate instead of being neutralized at the cathode. The inert carrier gas is any of the noble gasses such as helium, neon, argon, xenon or mixture thereof or any other gas or gas mixture (including nitrogen and air) which does not adversely effect either the process of generating the arc, the ionic and atomic oxygen or the intended target or substrate.

DETAILED DESCRIPTION

Figure 1:
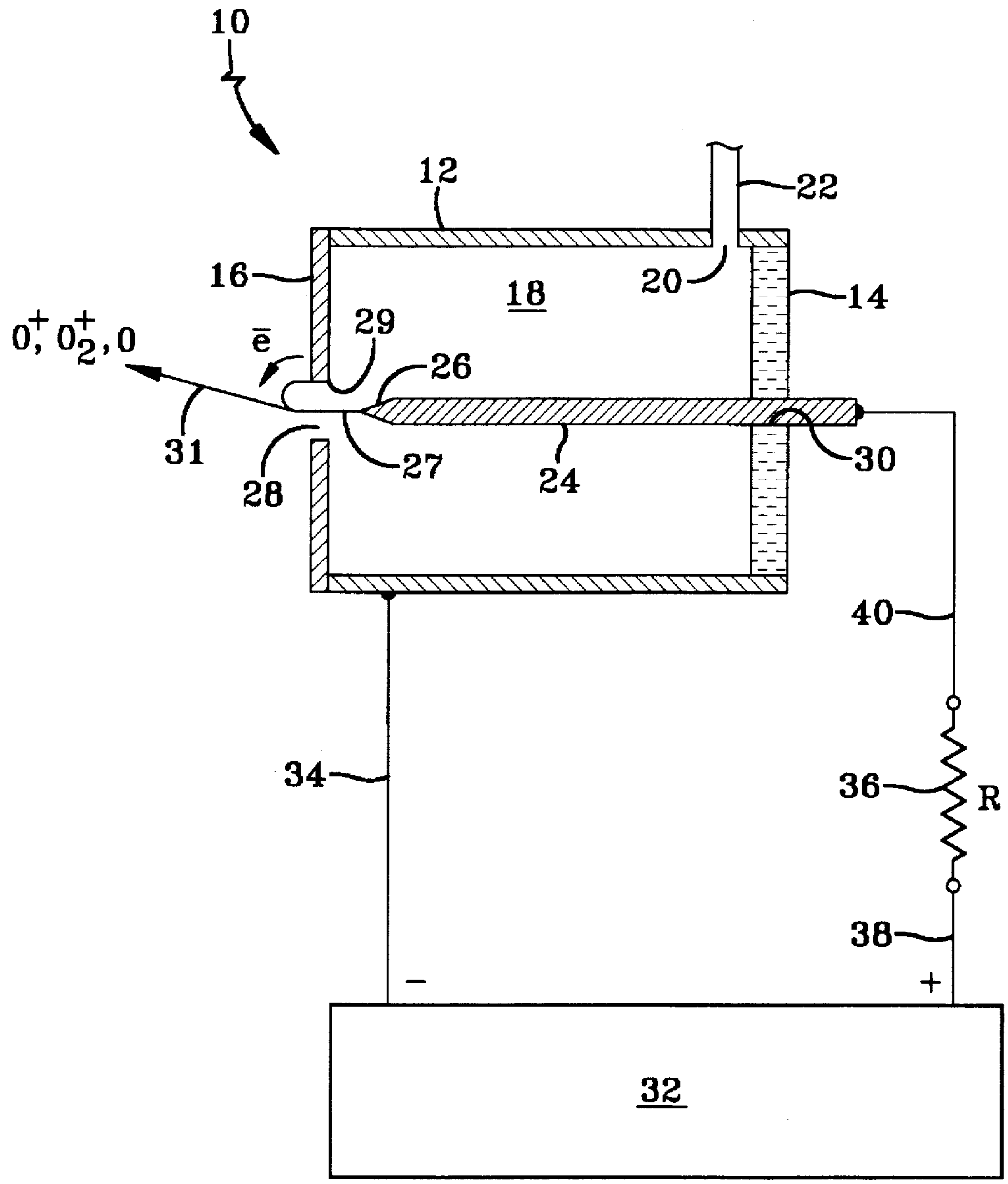
FIG. 1 is a schematic diagram of the electrode and arc configurations of an apparatus useful in generating the ionic beam in the practice of the invention.

FIG. 1 schematically illustrates a basic apparatus, including the electrode arrangement, for generating the ionic stream according to the method of the invention. Thus, apparatus 10 includes a housing defined by an outer wall 12 closed at one end with an electrically insulating material 14 and at the other, ionic stream emitting end, by an annular cathode 16 defining a cavity 18 within for receiving a gas stream comprising oxygen and an inert carrier gas and for directing the gaseous stream to and through the cathode end and then out of the apparatus. Outer wall 12 provides a means for containing the mixed gas to support the arc discharge. Wall 12 also contains an orifice 20 to which is attached gas conduit 22 which provides the gas stream for generating the arc and producing the ionized stream. In this embodiment, a cylindrical anode 24 is shown as terminating in a point 26 proximate, but longitudinally spaced upstream away from, the inner wall plane of the annular cathode 16. Cathode 16 is metal and is shaped like a washer or circular disk with a small hole or orifice 28 at its center. When an arc is initially struck between the anode and the cathode, its path is from the end 26 of the anode to proximately the inner periphery 29 of cathode bore 28. The cathode end of the arc then shifts to the outside of the cathode proximate the outside periphery of the bore producing a "J" or "L"-shaped arc as is roughly depicted by the curved line and arrow showing the electron flow "e" from the cathode. The upstream end of the arc 27 near the anode is straighter and the ionic oxygen produced by the arc is accelerated along the direction of the straighter arc path. The mass to charge ratio of the ionic oxygen is large enough so that at least a portion of the accelerated ionic oxygen is unable to make the turn proximate the cathode end of the arc and is propelled outward at an angle to the longitudinal axis of the apparatus as shown by arrow 31. This ionic oxygen is mixed with the carrier gas and the atomic oxygen produced by the arc which comprises the ionic stream generated by the device. In operation the arc is observed as a faint blue glow and a hissing sound is heard from it.

The anode 28 is supported within cavity 18 by means of a press fit in a bore defined by inner wall 30 in insulator 14.

The electrical output of high voltage D.C. power supply 32 is electrically connected at its negative or cathode end to cathode 16 of apparatus 10 by an electrical connection 34 and its positive output is electrically connected to the anode 24 through current limiting resistor 36 via electrical connections 38 and 40. In the embodiment schematically illustrated in FIG. 1, apparatus 10 is cylindrical in shape with outer wall 12 being a hollow cylinder or tube made of either metal or an electrically insulating material, whichever is convenient. Electrical insulator 14 which seals one end of the apparatus is made of any suitable electrically insulating material and typically a plastic such as polytetrafluoroethylene, polypropylene, polycarbonate, a polyacrylate or acrylic, a phenol-formaldehyde and the like. The insulator is cylindrical having a hole or bore extending therethrough at its center, with the longitudinal axis of the bore coincident with that of the insulator for receiving metal anode 24. The diameter of bore 30 and anode 24 are sized so as to achieve a press fit which both seals that end of the apparatus and supports the anode 24 within cavity 18, with the longitudinal axis of anode 24 coincident with the longitudinal axis of cylindrical outer wall 12 and electrical insulator 14. Gas conduit 22 is either plastic or metal tubing attached to the outer wall by any suitable means. As set forth above, metal cathode 16 is a simple metal annulus or disk somewhat similar to a washer having a circular orifice extending through it at its center, with the axis of the orifice coincident with the longitudinal axis of the anode 24. Cathode 16 is fabricated of any convenient metal, with stainless steel being convenient. The size of the orifice typically ranges from about 0.5–3 mm in diameter (50–150 mils). The tip of anode 24 is fabricated from an oxidation resistant metal such as stainless steel, gold, platinum, copper, chromium and the like. The high voltage D.C. power supply typically outputs anywhere from 3,000–30,000 volts with the value of the current limiting resistor being on the order of from less than one megohm to several megohms, depending on the output voltage and the size of the ionic stream desired. More typically the voltage supply provides an output on the order of from about 5–20 kilovolts (KV) through a current limiting resistor of from about 0.5–2 megohms.

In operation, the anode is biased at a voltage anywhere from about 3–30 KV above the ground potential of the cathode. The high voltage D.C. power supply connected to the cathode and through the high voltage current limiting resistor to the anode as shown in the Figure, causes an electric arc to occur between the cathode and the sharp end of the anode as explained in detail above. The flow of high velocity oxygen ions and the inert carrier gas out through orifice 28 in the cathode causes the arc to bend or bow outwardly and then back towards the outer periphery of the cathode orifice 28, so that a faint arc discharge can be seen around the outer periphery of the bore as is shown in the Figure. The high voltage resistor limits the current in the arc between the cathode and the anode. As explained above, oxygen ions formed in the vicinity of the end of the anode and along the path of the electric arc between the anode and cathode are accelerated toward the cathode and through the bore in the cathode. As a result of the high velocity of these oxygen ions, at least a portion of them are unable to make the bend in the arc to arrive on the downstream face of the cathode (the outer periphery of the orifice) and leave the arc path to continue on a trajectory downstream of the orifice out of the apparatus as shown in the Figure. Oxygen and the inert gas fed into the cavity of the apparatus passes the end of the anode and along the arc, exiting through the cathode orifice 28. Atomic oxygen is produced in and downstream of the arc through collision and charge exchange processes associated with the high velocity oxygen ions. An inert gas at atmospheric pressure carries the oxygen and provides means to prevent recombination of the ionic and atomic oxygen formed by the arc. The inert gas atoms reduce the probability of oxygen atom and ion recombination by separating the oxygen atoms and ions from each other. Both monatomic and diatomic oxygen ions can also charge transfer with inert gas atoms and the diatomic oxygen molecules to form energetic oxygen atoms and molecules which contribute along with the fast ions to forming a reactive beam capable of oxidizing materials placed in its path.

Figure 2:
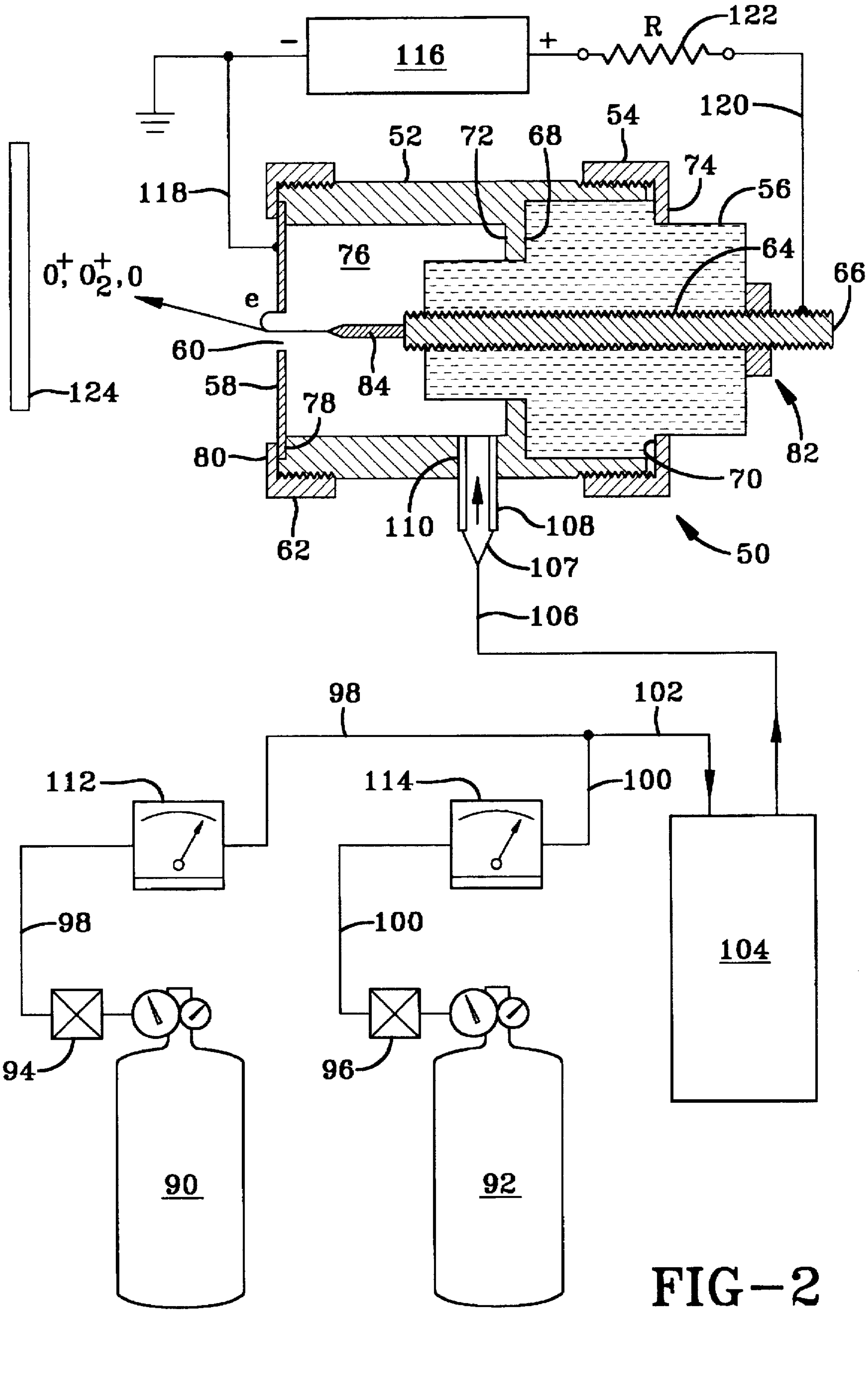
FIG. 2 schematically illustrates, in partial cross-section, a more detailed diagram of the apparatus, including means for providing and cooling the gasses.

FIG. 2 is a schematic diagram, in partial cross-section, of an apparatus used to demonstrate the invention. Turning to FIG. 2, apparatus 50 is illustrated as comprising a hollow aluminum cylinder 52 closed at one end by means of a shouldered screw cap 54 and an acrylic plastic electrical insulator 56 and closed at the cathode end by means of stainless steel plate 58 having an orifice 60 at its center and held in place by means of shouldered aluminum screw cap 62. Both ends of the aluminum cylinder are threaded with male screw threads as shown for mating with corresponding mating female threads in the shouldered screw Gaps 54 and 62. Insulator 56 is a stepped cylinder having a threaded bore 64 extending therethrough for receiving threaded stainless steel electrode 66 which has corresponding mating male threads. Threaded nut 82 secures anode 64 in place. The longitudinal axes of bore 64 and anode 66 are coaxial with the longitudinal axis of insulator 56, cylindrical outer wall 52 and the center of cathode bore 60. Insulator 56 has shoulder portions 68 and 70 which mate with respective shoulders 72 and 74 of wall 52 and cap 54. This enables cavity 76 to be sealed at the insulator end. Another shoulder 78 in cylinder 52 enables the cathode end of cavity 76 to be sealed except for the orifice 60 in the cathode plate. Thus, the washer or disc-shaped cathode plate 58 mates with shoulder 78 on cylinder 52, with cap 62 urging plate 58 against shoulder 78 of cylinder 52. Anode 64 terminates near the cathode in a replaceable stainless steel needle 84 made of an oxidation resistant material such as stainless steel as is main anode body 66. The end of the anode terminates in a pointed needle 84 so that the anode end of the arc doesn't wander which would continuously alter the trajectory of the ionized oxygen making it impossible to achieve a steady beam in a single direction. The diameter of the anode needle is on the order of ⅛ of an inch (20 mils) and has been found to operate satisfactorily with a diameter broadly ranging up to about 150 mils. The sharp end of needle 84 may range from 0.5–5 mm away from the plane of the interior surface of cathode 58 and preferably within about 1–3 mm, depending on the ionizing voltage, cathode orifice diameter and gas flow rate. The overall dimensions of the apparatus 50 employed to demonstrate the invention include a maximum outer diameter of 7 cm and a length of 13 cm. A mixture of oxygen and inert gas is fed from respective gas tanks 90 and 92, flow control valves 94 and 96, and gas lines 98, 100 and 102 into heat exchanger 104 in which the gasses are cooled, if desired, and fed into cavity 76 of apparatus 50 via flexible gas line 106, fitting 107 and metal gas tube 108 which extends into bore 110 and is secured therein by welding or brazing. The gas lines are flexible metal or plastic tubes, with tube 106 being attached to the end of metal tube as is known to those skilled in the art. Gas flow rate meters 112 and 114, along with the flow control valves, enable precise mixing and flow control of the oxygen and inert gas (in this case it is helium). Since an energetic beam tends to heat surfaces which it impinges upon, there will be occasions, depending on the strength of the arc and the gas flow rate, when the gasses will have to be cooled to prevent damage to the substrate. High voltage (5–20 KV) D.C. power supply 116 is electrically connected via electrical connections (cable) 118 and 120 to the cathode plate 58 and anode 66, respectively. A 0.5–2 megohm resistor 122 limits the arc current to produce more of a glow discharge than a plasma arc. This manifests itself as a faint blue arc in the vicinity of the outer periphery of the cathode orifice. A mixture of oxygen and helium is fed into the apparatus at a flow rate of 10–2,000 $cm^3$ per minute for the oxygen and 10–2,000 $cm^3$ per minute for the helium, for a total combined flow rate of 20–4,000 $cm^3$ per minute. While the gas flows perpendicularly into the arc cavity in the embodiment illustrated in the Figure, it may also be fed to impinge tangentially around the upstream end of the cavity for improved mixing and to reduce atomic and ionic oxygen recombination within the arc chamber 76. The flowing gas contacts the weak arc and produces the stream of ionized and atomic oxygen as indicated in the Figure by the arrow exiting the orifice at a slight angle due to the bending of the arc as shown. The active oxygen species impinge on the desired target and oxidize carbonaceous matter present on the surface. This has been demonstrated by using the ionic stream generated by the apparatus to etch the surface of Mylar (polyethylene terephthalate) plastic and to remove carbon soot deposits from the surface of Gesso coated canvas and white marble. The generated ionic stream was at room temperature and pressure during the demonstrations. Gas flows into the apparatus could easily be as high as 5,000 $cm^3$ per minute. The apparatus itself is easily configured to either be mounted on a suitable support or held in the hand and used much as a wand or an air brush for manually removing organic matter from delicate substrates.

While FIG. 2 illustrates a specific embodiment of the invention, the shape of the anode and cathode can be varied to optimize the ejection of oxygen ions and atoms from the arc region. The cathode may be conical in a manner so that the orifice is the most downstream object on the body of the atomic oxygen etcher apparatus. Other inert gasses including neon, argon and krypton can be used as set forth above and the room temperature or cooled gasses forced to flow through the central orifice in the cathode or may be partially diverted in a manifold or ring of apertures around the central orifice in the cathode to reduce recombination and provide cooling of the ionic beam. In the case of the gas flowing external to the central arc, it is preferred that it or they be inert gasses to further assist in reducing recombination of the atomic and ionic oxygen. If desired, the apparatus of the invention may be enclosed in an electrically grounded and thermally isolated enclosure. Further, either permanent magnets or electromagnets may be employed to produce an axial magnetic field parallel to the electric arc for the purpose of optimizing the arc and/or ionic stream produced by the arc. Still further, the cathode orifice may be elliptical or unsymmetrical.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentability and novelty which reside in the invention, including all the features and embodiments which would be treated as equivalents thereof by those skilled in the art to which the invention pertains.

What is claimed is:

1. A method for producing ionic and atomic oxygen which comprises contacting a gaseous mixture of oxygen and inert gas with a direct current electric arc proximate the anode end of the arc to form ionic and atomic oxygen species wherein said ionic oxygen is accelerated by said arc towards the cathode end of said arc, with said arc curved proximate said cathode end and wherein at least a portion of said accelerated ionic oxygen escapes said arc and does not follow said arc curve back to said cathode.

2. A method according to claim 1 wherein a high voltage direct current applied between said anode and said cathode produce said arc.

3. A method according to claim 2 wherein said arc path is from said anode to said cathode through an orifice proximate said cathode.

4. A method according to claim 3 wherein said current is resistance limited.

5. A method according to claim 4 wherein said voltage is between about 3–30 KV.

6. A method for removing organic matter from a substrate which comprises forming a gas stream comprising a mixture of ionic and atomic oxygen in inert gas and impinging said stream on said substrate whereby said stream removes said organic matter, said gas stream formed by contacting a gaseous mixture of oxygen and inert gas with a direct current electric arc proximate the anode end of the arc to form ionic and atomic oxygen species wherein said ionic oxygen is accelerated by said arc towards the cathode end of said arc, with said arc curved proximate said cathode end and wherein at least a portion of said accelerated ionic oxygen escapes said arc and does not follow said arc curve back to said cathode.

7. A method according to claim 6 wherein said cathode has an orifice therethrough through which said arc passes from said anode which is upstream of said cathode, said arc exiting said orifice downstream of said cathode and bending to contact said cathode proximate the downstream periphery of said cathode orifice.

8. A method according to claim 7 wherein said anode is needle shaped.

9. A method according to claim 8 wherein said arc is formed by a current limited high voltage direct current.

10. A method according to claim 9 wherein said voltage is from 3–30 KV.

11. A method according to claim 10 wherein said voltage is from about 5–20 KV.

12. An apparatus for generating a gas stream comprising a mixture of ionic and atomic oxygen in inert gas wherein said gas stream formed by contacting a gas comprising a mixture of oxygen and inert gas with a direct current electric arc proximate the anode end of the arc to form ionic and atomic oxygen species wherein said ionic oxygen is accelerated by said arc towards the cathode end of said arc, with said arc curved proximate said cathode end and wherein at least a portion of said accelerated ionic oxygen escapes said arc and does not follow said arc curve back to said cathode, said apparatus comprising a chamber defining a cavity within having an anode which terminates in a point, said chamber being closed at one end with a cathode having an orifice therethrough, said cathode being spaced apart from said anode and said anode point being located proximate said cathode orifice, said apparatus further including means for flowing said gas into said cavity to contact said arc therein to form said gas stream and flowing said gas stream out of said chamber through said cathode orifice.

13. An apparatus according to claim 12 further including means for generating said arc.

14. An apparatus according to claim 13 wherein said cathode orifice is circular.

15. An apparatus according to claim 14 wherein the end of said anode is spaced from about 0.5–5 mm away from said cathode orifice.

16. A method according to claim 15 wherein said cathode point is coaxial with the axis of said cathode orifice.

* * * * *